(12) United States Patent
Ieki et al.

(10) Patent No.: US 7,433,278 B2
(45) Date of Patent: Oct. 7, 2008

(54) OBJECTIVE LENS DRIVE HAVING A VARIABLE STIFFNESS FIXING MEMBER

(75) Inventors: Koji Ieki, Ehime (JP); Hiroshi Yamamoto, Yawata (JP); Yoshihiro Ikawa, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 505 days.

(21) Appl. No.: 10/532,141

(22) PCT Filed: Oct. 23, 2003

(86) PCT No.: PCT/JP03/13535

§ 371 (c)(1),
(2), (4) Date: Apr. 20, 2005

(87) PCT Pub. No.: WO2004/038709

PCT Pub. Date: May 6, 2004

(65) Prior Publication Data

US 2006/0156324 A1    Jul. 13, 2006

(30) Foreign Application Priority Data

Oct. 25, 2002    (JP)    ............................... 2002-310733

(51) Int. Cl.
   *G11B 7/09*    (2006.01)
   *G11B 7/085*   (2006.01)
   *G11B 7/08*    (2006.01)

(52) U.S. Cl. .................................. 369/44.16; 720/682

(58) Field of Classification Search ................. 720/677, 720/682, 685, 679, 684
See application file for complete search history.

(56) References Cited

U.S. PATENT DOCUMENTS

| 6,342,978 | B1 * | 1/2002 | Nishikawa et al. | 359/813 |
| 7,168,082 | B2 * | 1/2007 | Takeshita et al. | 720/683 |
| 7,287,264 | B2 * | 10/2007 | Akanuma | 720/681 |

FOREIGN PATENT DOCUMENTS

| JP | 03122829 | | 10/1989 |
| JP | 2001093177 | | 9/1999 |
| JP | 2001184681 | | 12/1999 |
| JP | 2002133688 | | 10/2000 |
| JP | 2002352456 | A * | 12/2002 |

* cited by examiner

*Primary Examiner*—Joseph Feild
*Assistant Examiner*—Peter Vincent Agustin
(74) *Attorney, Agent, or Firm*—Dickinson Wright, PLLC

(57) ABSTRACT

In order to obtain a preferred recording/reproducing characteristic in an apparatus for optical disks having higher density, an objective lens drive is provided for driving an objective lens (1) in the optical axis direction, a direction perpendicular to the optical axis, and a tilting direction along the radius of an optical disk, by which operating sensitivity is improved and a stable operating characteristic is realized. Sections of two (7b, 7e) of six fixing portions (7a to 7f) for supporting six support members (6a to 6f) which support a movable part (5), are set lower in stiffness than another sections of the other four fixing portions (7a, 7c, 7d, 7f), thereby improving the operating sensitivity of the movable part (5) and stabilizing the operation of the movable part (5).

1 Claim, 3 Drawing Sheets

OBJECTIVE LENS DRIVE HAVING A VARIABLE STIFFNESS FIXING MEMBER

TECHNICAL FIELD

The present invention relates to an objective lens drive used for an apparatus for optical disks and particularly relates to the fixing portions of an elastic support member for elastically supporting a movable part composed of an objective lens, driving coils, a lens holder and so on.

BACKGROUND ART

There have been demands for an objective lens drive which drives an objective lens, which condenses light on a recording surface of an optical disk, in a tilting direction of the optical axis of the objective lens in addition to the optical axis direction and a direction perpendicular to the optical axis in order to correct optical coma aberration in an apparatus for optical disks having higher density. For example, Patent document 1 (Japanese Patent Laid-Open No. 2001-93177) discloses such an objective lens drive. The prior art disclosed in Patent document 1 will be taken as an example below to describe a conventional objective lens drive in accordance with the accompanying drawings.

FIG. 3 is a perspective view showing the conventional objective lens drive. A movable part of the objective lens drive is constituted of an objective lens 31 for condensing a light beam on an optical disk, a lens holder 32 for holding the objective lens, and three coils 33 for driving the objective lens in the optical axis direction, a direction perpendicular to the optical axis, and a tilting direction of the optical axis. The movable part has one end fixed on a fixing part 35 via six elastic support members 34 which elastically support the movable part. Current is applied from the six elastic support members 34 to the three coils 33 to operate the movable part in the optical axis direction, the direction perpendicular to the optical axis direction, and the tilting direction of the optical axis.

In the apparatus for optical disks, in order to position light, which has been condensed by the objective lens, in the optical axis direction, the direction perpendicular to the optical axis, and the tilting direction of the optical axis with high accuracy and low power consumption, there have been demands for higher operating sensitivity in all the directions in the objective lens drive.

In order to improve the static operating sensitivity in the optical axis, the direction perpendicular to the optical axis direction, and the tilting direction of the optical axis, it is necessary to increase the thrust of the objective lens drive by increasing the efficiency of a magnetic circuit and to reduce the spring constant of the support member.

However, according to the contents disclosed in Patent document 1, the movable part is elastically supported by the six linear elastic support members and thus the operating sensitivity is not necessarily improved to a sufficient level. Further, since the movable part is supported by the six linear elastic support members, excessive restraint makes the operation of the movable part unstable.

Moreover, in the case where a coil-shaped part or a bent part is provided on a part of at least two of the six elastic support members, the operating sensitivity is improved and the excessive restraint is eliminated. However, two of the six support members have different shapes and thus the cost is increased by a larger number of assembling steps and more complicated operations.

The present invention is devised to solve this problem and its object is to provide an objective lens drive which improves operating sensitivity and assembling workability when driving and controlling light, which has been condensed by an objective lens, in the optical axis direction, a direction perpendicular to the optical axis, and a tilting direction of the optical axis.

DISCLOSURE OF THE INVENTION

In order to attain this object, an objective lens drive of the present invention has six linear support members for operably supporting a movable part, which includes a lens holder for holding an objective lens, in the optical axis direction, a direction perpendicularly to the optical axis and a tilting direction of the optical axis, and six fixing portions for fixing the support members. Two of the six fixing portions are made of a material lower in stiffness than the other four portions.

The invention of claim 1 comprises an objective lens for condensing a light beam on an optical disk, three driving coils for driving the objective lens in the optical axis direction, a direction perpendicular to the optical axis, and a tilting direction along the radius of the optical disk, a movable part including the driving coils and a lens holder for holding the objective lens, elastic support members composed of six linear members each of which has one end fixed to the movable part and elastically supports the movable part, six fixing portions for fixing thereto the other ends of the elastic support members, and a magnet for generating driving force for the driving coils. Sections of two of the six fixing portions are lower in stiffness than another sections of the other four fixing portions. Here, the support member is advantageously reduced in spring constant and the excessive restraint of the movable part is reduced.

According to claim 1, the sections of two of the six fixing portions for supporting the support members are lower in stiffness than the other sections of the other four fixing portions, so that the operating sensitivity of the movable part can be improved and the operation of the movable part can be stabilized.

The invention of claim 1 is the objective lens drive in which the fixing portions are formed in a member with low stiffness that is boned with a reinforcing member, and the reinforcing member is shaped to exclude the sections of two of the six fixing portions. Thus, the configuration of the six fixing portions according to claim 1 can be readily realized.

That is, according to claim 1, the fixing portions are formed in the low-stiffness material bonded with the reinforcing member, thereby improving assembling workability.

Further, in an optical disk apparatus using the objective lens drive of the present invention, optical coma aberration can be corrected, thereby reducing the degradation of a light spot due to aberration and improving signal quality for recording and reproduction.

BEST MODE FOR CARRYING OUT THE INVENTION

Figure 1:
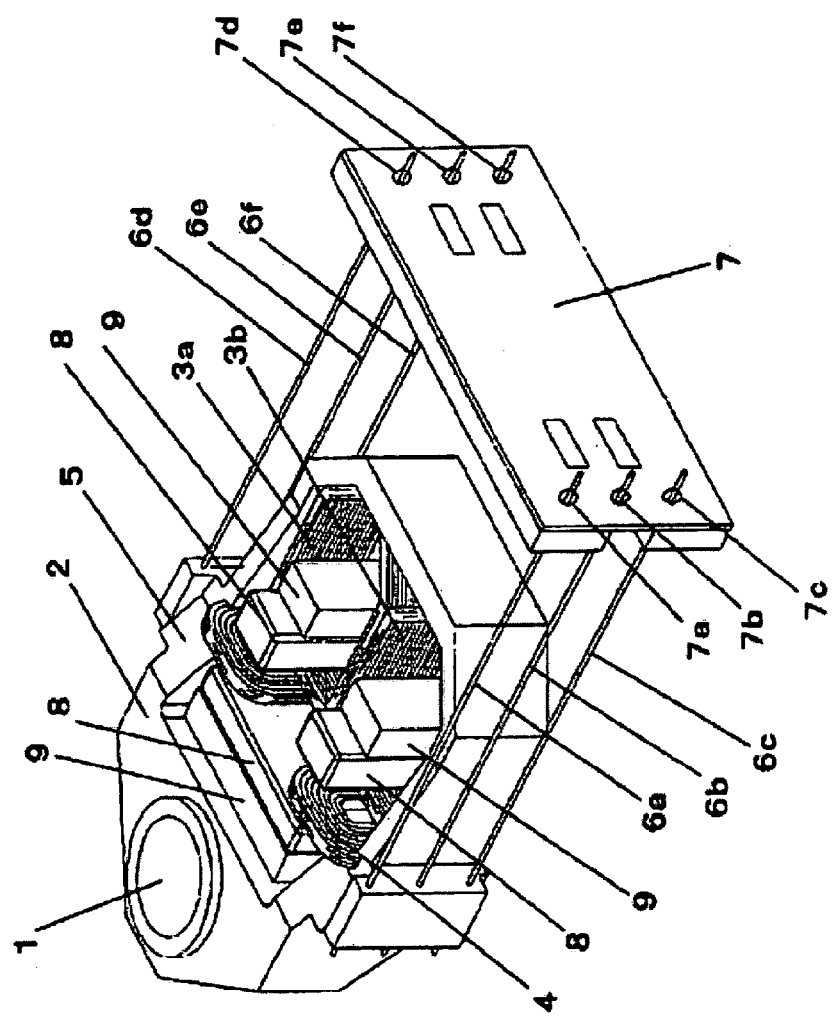
FIG. 1 is a perspective view showing the configuration of an objective lens drive according to the present invention.

An embodiment of the present invention will be described below in accordance with the accompanying drawings. FIG. 1 is a perspective view showing the configuration of an objective lens drive according to the present invention.

Two focusing coils 3 and a tracking coil 4 are mounted in a lens holder 2 for holding an objective lens 1. The objective lens 1, the lens holder 2, focusing coils 3a and 3b, and the tracking coil 4 constitute a movable part 5. Linear six support members 6a, 6b, 6c, 6d, 6e, and 6f have ends fixed on the outer edge of the lens holder 2 and the other ends fixed on fixing portions 7a, 7b, 7c, 7d, 7e, and 7f. The six support members 6a, 6b, 6c, 6d, 6e, and 6f movably support the movable part 5 on a fixing member 7. Permanent magnets 8 are opposed to each other so that the two focusing coils 3 and the tracking coil 4 are sandwiched between the permanent magnets 8 and are fixed on yokes 9 made of a magnetic substance.

The objective lens drive is driven as follows: driving current is applied to the two focusing coils 3 so that electromagnetic forces are generated in the same direction by the action of magnetic fluxes from the permanent magnets 8, and the movable part 5 is driven in the optical axis direction of the objective lens. Further, driving current is applied to the two focusing coils 3 so that electromagnetic forces are generated in opposite directions by the action of magnetic fluxes from the permanent magnets 8. Thus, the movable part 5 is driven in a tilting direction of the objective lens. In this case, the two focusing coils 3 are used for driving in the optical axis direction of the objective lens and the tilting direction of the objective lens. A tilted driving coil may be mounted in the movable part in addition to the focusing coils to perform driving in the tilting direction of the objective lens. Further, driving current is applied to the tracking coil 4 so that the movable part 5 is driven in the direction perpendicular to the optical axis.

Figure 2:
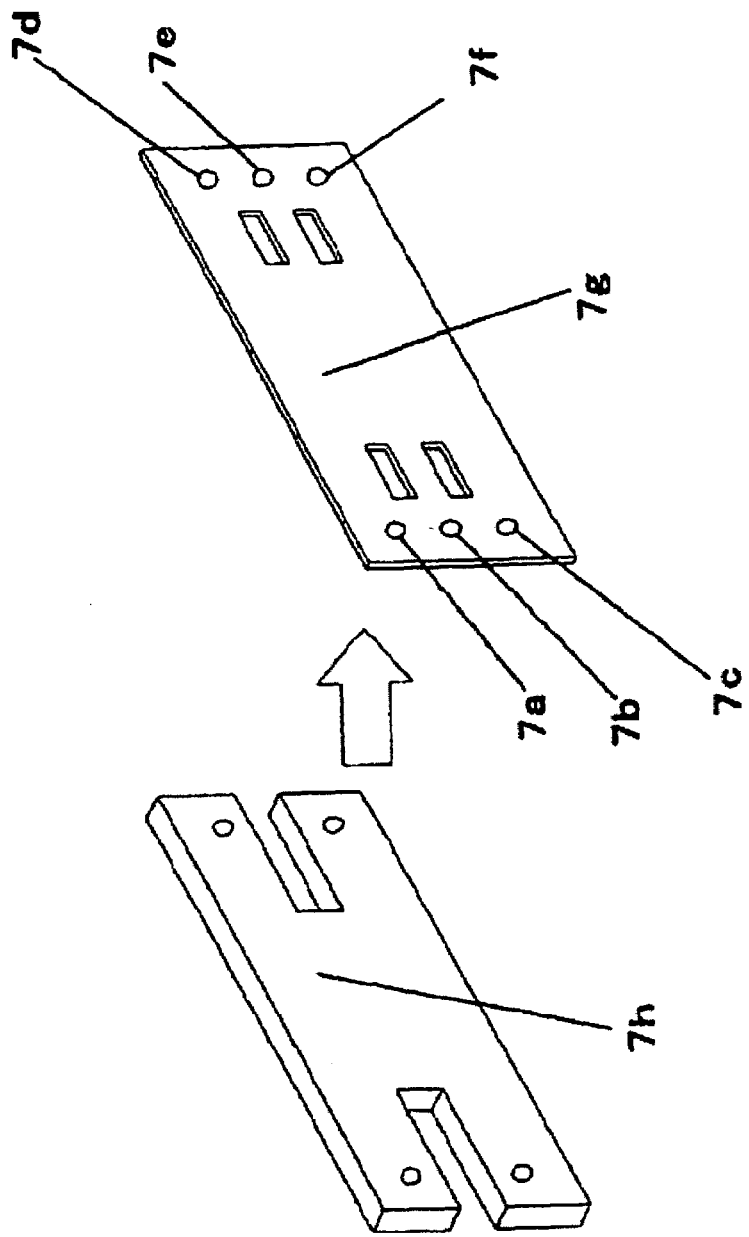
FIG. 2 is a perspective view showing the configuration of fixing portions of the objective lens drive according to the present invention.
Figure 3:
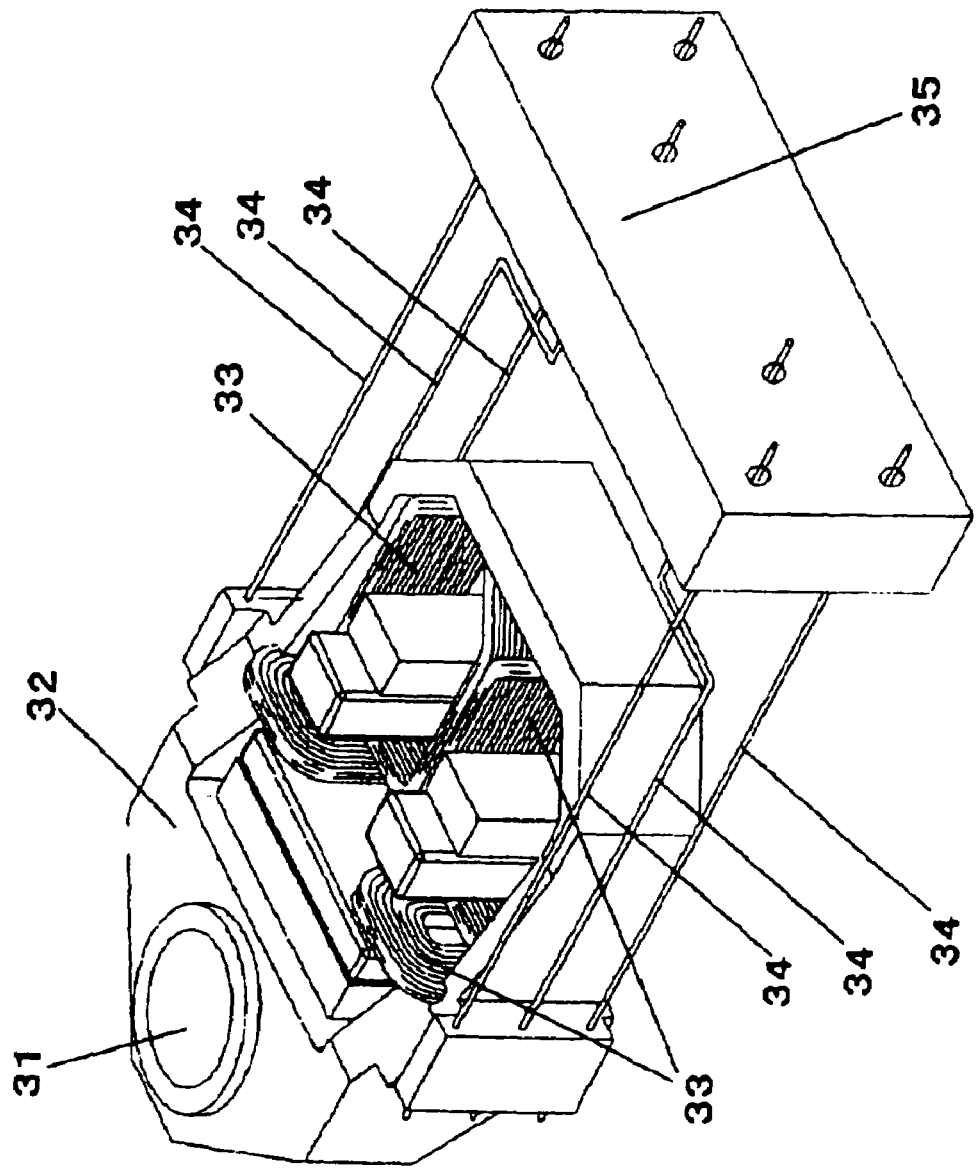
FIG. 3 is a perspective view showing the configuration of a conventional objective lens drive.

Referring to FIG. 2, the configuration of the fixing member 7 of six portions will be described below. The fixing member 7 has the six fixing portions 7a, 7b, 7c, 7d, 7e, and 7f each of which has a hole. The six support members 6a, 6b, 6c, 6d, 6e, and 6f are respectively inserted into the holes provided on the fixing portions and are fixed on the lens holder 2 and the fixing member 7 by means of soldering and so on.

Further, the fixing member 7 is configured so that a flexible printed board 7g with low stiffness is bonded to a reinforcing plate 7h having a reinforcing member made of glass epoxy and so on with high stiffness. The reinforcing plate 7h is formed so as to avoid the two fixing portions 7b and 7e. Thus, when the flexible printed board 7g and the reinforcing plate 7h are bonded to each other, the four fixing portions 7a, 7c, 7d, and 7f are composed of two layers of the flexible printed board 7g and the reinforcing plate 7h, whereas the two fixing portions 7b and 7e are composed only of the flexible printed board 7g. Therefore, the two fixing portions 7b and 7e are lower in stiffness than the other four fixing portions 7a, 7c, 7d, and 7f.

The two fixing portions 7b and 7e of the six fixing portions are lower in stiffness than the other four fixing portions 7a, 7c, 7d, and 7f in the present embodiment. Thus, while the movable part 5 is stably supported by the fixing portions 7a, 7c, 7d, and 7f, the support members 6b and 6e fixed on the fixing portions 7b and 7e are reduced in spring constant to improve the operating sensitivity of the movable part 5 and the operation of the movable part can be stabilized by reducing the excessive restraint of the movable part.

Further, the fixing member 7 is configured so that the flexible printed board 7g is bonded to the reinforcing plate 7h, so that the fixing portions can be readily varied in stiffness due to the different shapes of the flexible printed board 7g and the reinforcing plate 7h. Since the six support members are all shaped like straight lines, the assembling process can be simplified to improve workability.

The invention claimed is:

1. An objective lens drive, comprising:
   an objective lens for condensing a light beam on an optical disk,
   a driving coil for driving the objective lens in an optical axis direction, a direction perpendicular to the optical axis, and a tilting direction along a radius of the optical disk,
   a movable part including the driving coil and a lens holder for holding the objective lens,
   six substantially straight elastic support members each having one end being fixed to the movable part, for elastically supporting the movable part,
   a fixing member having six fixing portions each for fixing the other end of each of the elastic support members thereto, and
   a magnet for generating driving force for the driving coil, wherein:
   the fixing member has lower stiffness in sections thereof respectively formed with two of the six fixing portions than sections thereof respectively formed with the other four fixing portions, and
   the fixing member is formed in a low-stiffness member bonded with a reinforcing member, the reinforcing member having a shape excluding the sections of the two fixing portions out of the six fixing portions.

* * * * *